United States Patent Office 2,891,217
Patented June 16, 1959

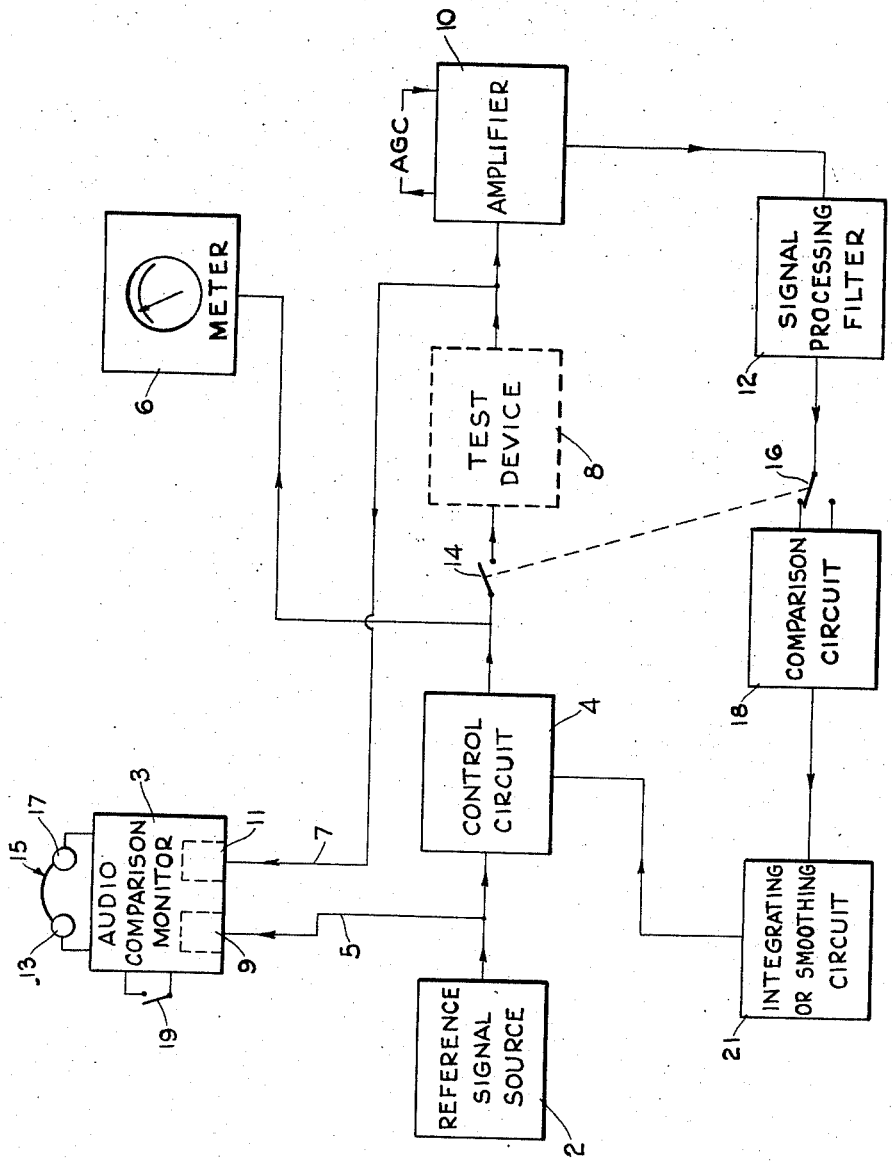

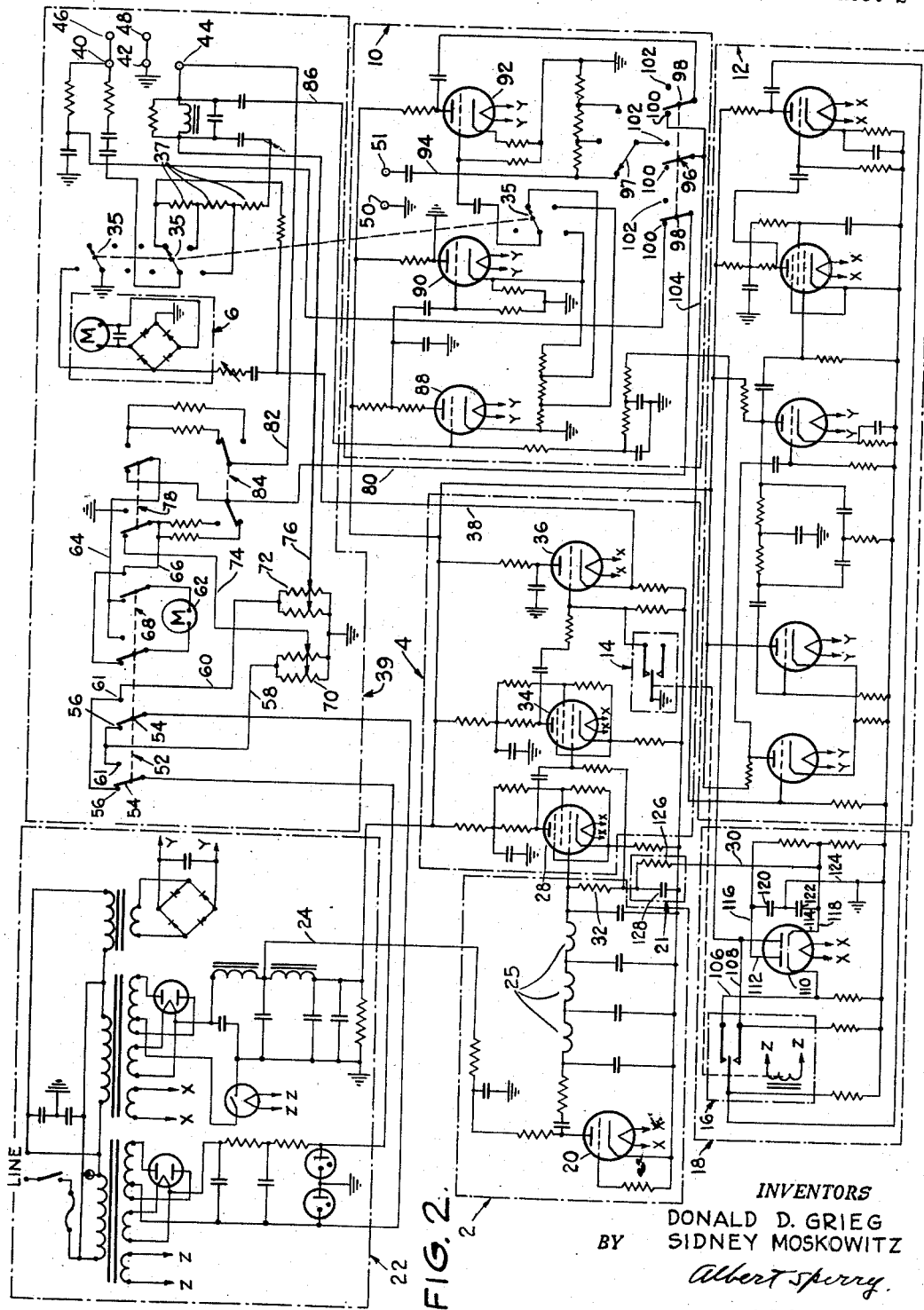

2,891,217

NOISE FIGURE METER

Donald D. Grieg, North Caldwell, and Sidney Moskowitz, Fairlawn, N.J., assignors to Electronic Research Associates, Inc., Caldwell, N.J., a corporation of New Jersey Application December 16, 1954, Serial No. 475,606

10 Claims. (Cl. 324—57)

This invention relates to electrical instruments and is particularly directed to instruments for automatically and accurately measuring and indicating the internal noise of electrical devices, such as transistors and transistor amplifiers, vacuum tube devices or signal handling apparatus, for example.

Practically all electrical devices possess certain internal noise characteristics which not only vary with each different type of device but also vary in different samples of the same type of device. Moreover, the internal noise of any particular device varies with changes in temperature, frequency or bandwidth, voltage and current. Thus, for example, present transistors and transistor amplifiers have inherent noise characteristics which vary approximately inversely with frequency. Such variations are independent of external interferences or noises which may be due to local conditions or other external influences.

The noise characteristics are generally indicated as noise figures in terms of decibels and, in order to design electrical equipment having a satisfactory and consistent standard of performance, it is therefore desirable to be able to determine the noise figure of the various devices used in the equipment. Determination of the noise figure of transistors and transistor amplifiers or vacuum tubes and vacuum tube amplifiers is particularly important since this figure determines the limit of amplification and ultimate sensitivity of the device and may vary greatly with each device. It has recently been determined also that the noise figure of transistors is a good indicator of the ultimate reliability of these elements. On the other hand, the operations heretofore required to determine the noise figure of these devices have made it practically impossible to test every transistor or vacuum tube or amplifier individually.

No device has been previously developed for automatically determining the noise figure of transistors or vacuum tube devices and no method or means has been suggested which would provide a direct reading of the noise figure. For these reasons, it has been usual practice heretofore to test only a few units out of each batch produced to afford a spot check on their noise figure characteristics. The noise figures provided by manufacturers have therefore merely been an expression of the order of magnitude of the noise figure. As a result, equipment wherein these devices are used is frequently uncertain or faulty in operation and it is practically impossible to maintain a predetermined standard of performance.

These disadvantages of the prior art are overcome with the present invention and a noise figure meter is provided which may be used to accurately and automatically indicate the noise figure of amplifying and detection devices or other electrical devices. Moreover, the present invention provides means for direct reading of the noise figure for any device under test.

A further advantage of the noise figure meter of the present invention resides in the fact that determinations are made repeatedly and at a high rate of speed so as to afford a monitoring effect. Thus, a substantially constant check can be kept and variations due to gain, frequency and other factors will not influence the accuracy of the readings.

Furthermore, the device is extremely simple to operate and devices to be tested may be connected and disconnected easily and quickly. Consequently, although appreciable time together with skilled operators have heretofore been required to make each determination of the noise figure of a device when using methods of the prior art, the present invention allows such determinations to be made in a matter of a few seconds using unskilled personnel. Production line checking and quality control may therefore become a reality and the reliability and use of amplifying and detecting devices may be greatly increased in both laboratory and factory applications.

While the invention is particularly useful in noise figure meters, it also has applications in other relations wherein it is desired to determine the power of an unknown signal by comparison with a known reference signal.

The advantages of the present invention are preferably attained by comparing a known reference signal with the signal of a device to be tested and automatically adjusting the value of the reference signal to match the value of the signal of the test device. This comparison is preferably made repeatedly and rapidly by continuously operating means which actuate a ratio detector so as to afford a substantially constant indication of the signal power of the device under test. Moreover, the value of the reference signal is made responsive to feedback from the ratio detector so as to match it to the value of the signal from the device under test and a power meter is connected to the reference source, thereby giving a direct reading which indicates the signal power of the device.

One of the objects of the present invention is to provide an electrical circuit with means operable to determine the power of a signal having unknown characteristics.

Another object of the present invention is to provide a novel noise figure meter which will rapidly and automatically give accurate determinations of the noise figure of transistors, transistor amplifiers, vacuum tubes and other electrical devices.

Another object of the present invention is to provide a novel noise figure meter which will make possible direct readings of the noise figure of transistors and transistor amplifiers, vacuum tube and vacuum tube amplifiers, and other types of amplifying or detection devices.

A further object of the present invention is to provide a noise figure meter which will render substantially continuous readings of the noise figure for either evaluation or monitoring purposes.

These and other objects and features of the present invention will be apparent from the following description thereof taken in connection with the figures of the accompanying drawing.

Fig. 1 is a block diagram of a typical noise figure meter embodying the present invention; and Fig. 2 is a typical wiring diagram of the noise figure meter of Fig. 1.

In that form of the invention chosen for purposes of illustration in the drawing, the noise figure meter is shown in Fig. 1 as comprising a variable output reference signal source 2, such as a noise generator, whose power output is regulated by control circuit 4 and measured by a power indicating meter 6 calibrated in noise figure values, such as decibels.

Since the value of the noise generated or otherwise developed within the device to be tested is, obviously, unknown, it must be compared with a known reference signal. Moreover, the noise may be amplified or attenuated by various factors within the device. Consequently, the method preferably employed for determining the value of the noise of the deviec is to periodically pass the refernce signal through the device to be tested and to compare the output signal of the device alone to the output signal of the device when the reference signal is applied to the device. The value of the reference signal is then varied until the combined signal of the device under test, plus the reference signal source, is exactly twice the value of the signal of the device alone. When this condition is attained, the value of the reference signal will just equal the value of the internal noise of the device and, since the reference signal value is known, the value of the internal noise of the device is also known.

Accordingly, the output of the noise generator 2 is supplied to the input of the device 8 which is to be tested. The output of the device 8 is preferably passed through an amplifier 10 to a filter 12. However, if the device under test incorporates sufficient amplification, the amplifier 10 may be omitted. The filter 12 serves to isolate a desired portion of the noise spectrum of the device under test. For example, when measuring transistors, since the internal noise of transistors varies inversely with frequency, noise figures for transistors are usually specified for 1000 cycles per second at a bandwidth of one cycle per second. Consequently, when testing transistors the filter 12 may be designed so that only 1000 cycle signals will be passed and other frequencies filtered out. The signal in the output from the device under test is therefore an amplified 1000 cycle signal.

Moreover, a continuously operating interrupter switch 14, which may be mechanical, electromechanical or its electronic equivalent, is arranged to alternately open and close the circuit at a high rate of speed, for example, 60 times per second, whereby the output signal from the device 8 actuatlly is a complex signal which consists of two signal components which are transmitted alternately. One of these signal components may be termed the "noise signal" and consists of the internal noise of the device 8 alone, while the other signal component may be termed the "combined signal" and is the sum of the internal noise of the device 8 and the output signal of the noise generator 2. After passing amplifier 10 and filter 12, the complex signal may be fed through monitoring switch 16 to comparison circuit 18 which has two separate inputs.

Monitoring switch 16 is preferably of the same type as interrupter switch 14 and is connected to operate synchronously with switch 14. Consequently, switch 16 serves to sepaarte the complex signal output of the device under test into its two components, namely, the noise signal and the combined signal. These two signal components are then fed alternately and independently to the separate inputs of comparison circuit 18.

The comparison circuit 18 includes a ratio detector by which the difference between the power of the signal components is supplied to the control circuit 4 to vary the power output of the noise generator 2 to compensate for differences between the signal components. Preferably, a smoothing or integrating circuit 19 is included between comparison circuit 18 and control circuit 4 to smooth the signal supplied to the control circuit 4.

The output of the noise generator or reference signal source is varied by the output of the comparison circuit until the value of the combined signal attains a desired ratio to the value of the noise signal of the device 8, for example, two to one. The output power of the noise generator 2 is then equal to the power of the internal noise of the device 8 and, since power meter 6 is calibrated in noise figures the power meter 6 provides a direct reading which corresponds to the noise figure of the device 8.

Switches 14 and 16 operate at sufficient frequency to allow determinations of the noise figure of the device under test to be made almost instantaneously and provide for continuous monitoring of the device under test when desired. Any changes in the noise figure will immediately be reflected in the reading on the power meter. Consequently, the effect on the noise figure of changes in various parameters may be studied. Moreover, the noise figure can be determined directly and instantaneously for production line determination of the noise figure and quality control of transistors and other elements.

As further indicated in Fig. 1, it is also possible when desired to make an audible comparison between the output of the noise generator 2 and the internal noise of the device 8 which is under test. Thus, as shown, an audio comparison monitor 3 may be connected into the system as by the lead 5 which is connected to receive the output of the noise generator 2 and the lead 7 which is connected to receive the internal noise signal of the device under test. The audio comparison monitor 3 preferably is provided with two independent channel amplifiers 9 and 11. The amplifier 9 is connected to the ear phone 13 of head set 15 so as to supply the amplified noise generator signal to that ear phone. On the other hand, the amplifier 11 is connected to the ear phone 17 of head set 15 and serves to supply the amplified internal noise signal of the device 8 to that ear phone. In this way, the two noise signals can be supplied to the ear phones for audible comparison by an operator or observer. When using the audible comparison means, it is preferable to provide the audio comparison monitor 3 with a switch 19 which may be operated to disconnect the synchronous switches 14 and 16. The comparison may then be made by the observer under established conditions and, if desired, these conditions can be varied and a new determination made under the new conditions.

In order to illustrate the applicants' invention more fully a typical form of circuit embodying the present invention is shown in Fig. 2. While the specific embodiment shown in Fig. 2 is primarily intended for measuring the noise figures of transistors and transistor amplifiers, it will be understood that the invention is equally applicable to the measurement of noise figures of vacuum tubes, vacuum tube amplifiers and other amplifying or signal detecting devices. The blocks of Fig. 1 are indicated by broken lines surrounding the corresponding portions of the circuit in Fig. 2.

The noise generator 2 illustrated comprises a gas-filled tube 20 which receives current from power supply 22 through lines 24. The output of tube 20 is passed through wave traps 25 and thereby establishes a reference signal having predetermined characteristics. The signal thus produced is impressed on the grid of tube 28 in control circuit 4. The grid of tube 28 is also supplied with feedback voltage from the output of comparison circuit 18 through line 30 and across resistor 32 to automatically vary the gain of the control amplifier 4 and the power of the reference noise signal supplied to power meter 6.

The control circuit 4 may embody several stages of amplification and/or low impedance coupling if desired, as indicated by tubes 34 and 36, respectively. The output of the final stage of amplification of the control circuit is supplied to the power meter 6 through the line 38. Power meter 6 is calibrated in decibels to give direct reading of the value of the output power of the noise generator and when this power equals the internal noise power of the device under test, the reading on the meter 6 will equal the noise figure of the device, thus permitting direct reading of the noise figure of the device under test. In addition, ganged switches 35 are provided which may be used to increase or decrease the meter range in predetermined steps, for example, 20 decibels per step, by adding or subtracting resistances 37 from the circuit.

The power meter 6 may conveniently be located directly on or adjacent a test panel 39 on which sockets, connectors or other contacts are mounted for receiving the leads or terminals of the device to be tested. Since the equipment described is particularly adapted for use in testing transistors or transistor amplifiers, the test panel may be provided with contact 40 for connection with a transistor emitter, contact 42 for connection with the transistor base, and contact 44 for connection with the transistor collector. In addition, or in the alternative, the test panel may be provided with contacts 46 and 48 for connection with a transistor amplifier input.

The device under test, whether a transistor or a transistor amplifier, is connected to the power supply 22 which is adapted to supply both emitter and collector biases for the device undergoing test. The amount and polarity of these biases may be selected by means of a testing switch 52 associated with the test panel 39. When testing NPN type transistors the arms 54 of the test switch 52 are moved to the position shown in Fig. 2 in which they engage contacts 56 to provide negative emitter and positive collector biases through lines 58 and 60 respectively. When testing PNP type transistors, the arms 54 of the test switch are moved to engage contacts 61 to provide negative collector and positive emitter biases through lines 58 and 60.

The amount of the biases provided in any case may be indicated by a volt-ammeter 62 which is connected into the circuit through lines 64 and 66 under the control of a switch 68 operable in unison with test switch 52. The bias provided for any test is adjusted as desired by varying the bias controlling resistances 70 and 72 in lines 74 and 76, respectively. A switch 78 is provided to connect volt-ammeter 62 between lines 74 and 80 to provide an indication of the emitter current, or between line 82 and ground to indicate the collector voltage. The volt-ammeter 62 is provided with two scales affording an adjustment in range of operation and a range controlling switch 84 may be used to provide for full scale emitter current readings in the range of 1 or 10 milliamps and for full scale collector voltage readings of 10 or 100 volts. A single instrument can thus be used to indicate the conditions under which any transistor or other device is being tested.

When testing transistors the output current with its inherent noise characteristics flows from the collector at contact 44 through conductor 86 to the grid of the tube 88 of amplifier 10. The amplifier may, of course, have as many amplifying or low impedance coupling stages as desired and as shown includes two additional stages represented by tubes 90 and 92.

When testing transistor amplifiers, it is not generally necessary to employ so many stages of amplification and as shown, the contacts 50 and 51 of the test panel, to which the output of the transistor amplifier are attached during test, are connected respectively to ground and to line 94 leading to a selecting switch 96. If desired, amplification attenuating means 97 may also be included in the circuit including the final stage of amplification when testing transistor amplifiers to bring current value into the desired range for indication by the power meter 6.

In any event, the selecting switch 96 has contact arms 98 movable to engage contacts 100 when a transistor is under test and movable to engage contacts 102 when a transistor amplifier is under test. Therefore, when testing either type of device, the output current from the device under test will flow through conductor 104 to the filter 12. The filter, of course, may be designed so as to be fixed or variable to pass whatever frequency or range of frequencies or bandwidths may be needed or desired for conducting any particular test. However, when testing transistors it is preferable to use or adjust the filter to pass only 1000 cycle signals and to filter out all other frequencies.

With the noise figure meter of the present invention, the desired comparison of the combined signal with the noise signal and the compensating adjustment of the reference signal is accomplished automatically. To periodically pass the reference signal from noise generator 2 through the device under test, continuous operating interrupter switch 14, which in this specific embodiment is of the electromechanical type, is provided and arranged to alternately ground the grid of tube 36 in control amplifier 4. Thus, the reference signal from the noise generator is alternately passed and blocked to the input of the device under test. The switch may be of any desired type but preferably operated rapidly, for example, 60 times per second.

As a result, the signal transmitted by the device under test is the complex signal consisting of an alternate succession of the noise signal and the combined signal. The complex signal is amplified and filtered, as described above, and is passed to monitoring switch 16. Monitoring switch 16 is operated in synchronism with interrupting switch 14 and, consequently, serves to separate the complex signal into its two components and feeds the noise signal to input 106 of the comparison circuit 18 while the combined signal is fed to input 108 of the comparison circuit.

In order to compare the noise signal with the combined signal, inputs 106 and 108 are passed through diode detector 110 to outputs 112 and 114, respectively. The two outputs 112 and 114 of the diode detector 108 are connected by lines 116 and 118 to a ratio detector including the condensers 120 and 122 which are arranged in opposed relation with a ground connection 124 therebetween. Condenser 120 is charged by the noise signal of the device alone, while condenser 122 is charged by the combined signal of opposing polarity. The difference in the charge on these two condensers is fed back through line 30 to the grid of tube 28 where it serves to vary the gain of the control amplifier to compensate for differences between the two components. These condensers, together with resistance 126 and condenser 128, serve to smooth out or integrate rapid fluctuating of the signal, noise and switching transients and provide for a smooth control voltage. The voltage feedback thus effected may be either positive or negative but when the value of the combined signal is just twice the value of the noise signal, the charges on condensers 120 and 122 will balance and there will be no feedback to the control amplifier through line 30. The output power of the reference signal will then be just equal to the power of the internal noise of the device under test and the power meter 6 will consequently indicate directly the value of the internal noise.

In operation, the noise figure meter is quite simple. To determine the noise figure of a transistor, the transistor is connected into the circuit with the emitter, base and collector attached to terminals 40, 42 and 44, respectively. Thereafter, the appropriate biases and polarities are set up by manipulating the switches 54 and 78 and controls 70 and 72. These are monitored by meter 62. Since determinations of the noise figure are made substantially instantaneously, a reading may now be taken from meter 6 which will correspond directly to the noise figure of the transistor under test.

When it is desired to ascertain the noise figures of a number of transistors, for example in production quality control, all that need be done is to adjust the resistances 70 and 72 for the proper biases and, thereafter, any number of transistors may be tested as quickly as they can be connected and disconnected to terminals 40, 42 and 44. If the device under test is an amplifier, rather than a transistor alone, switch 96 is moved to engage contacts 102 and the biasing adjustments are then unnecessary.

It will also be clear that while the circuit shown has for illustrative purposes been limited to the measurement of transistors and transistor noise, the noise figure of vacuum tubes, or vacuum tube amplifiers, or magnetic amplifiers or other signal amplifying or detecting means can be measured with equal facility without basic change of the described combination. Thus, for measuring the noise figure of vacuum tubes over an audio range, the terminals 40 and 42 would be applied respectively to the grid and cathode of the vacuum tube and the terminal 44 to the plate. These terminals would, of course, be fed with grid biases and plate power appropriate to the device under test. For measurement over the full audio band the 1000 cycle filter would be modified so as to give broad band audio response.

If it is desired to measure the noise figure of an IF or RF amplifier operating at amplification frequencies above the audio range, the noise generator would be replaced with a noise or signal source producing energy within the desired range, and the various amplifying, coupling, and filtering stages would likewise be designed to operate at the desired frequencies.

It is clear that these and other modifications can easily be made by one skilled in the art so as to accommodate various devices generating internal noise whose noise figure it is desired to measure by means of this device. Moreover, while signal source 2 has been described as a noise generator, any other type of signal source may obviously be substituted. Although the instrument has been described primarily as a noise figure meter, it is also possible to connect an antenna to the instrument in place of a transistor and the instrument may then be used to determine the power of any weak signal. Furthermore, if a signal of known value is supplied in place of the test device, the instrument may be used to monitor the output of signal source 2.

Furthermore, if it should be desired to determine the variation in the internal noise characteristics of a transistor or other device under varying conditions of operation, such determinations can be readily made. Thus, for example, a different reference signal source may be used or various wave filters may be included in the circuit so as to supply a reference signal of known or varying characteristics to the device under test. In this way, the change in internal noise with change in frequency or any other desired conditions can be determined. Numerous other alterations and modifications may, obviously, be made. Therefore it should be clearly understood that the form of the invention described above and shown in the figures of the accompanying drawing is illustrative only and is not intended to limit the scope of the invention.

We claim:

1. Means for controlling the power of a signal comprising a variable output signal source, a substantially constant output signal source, interrupting means for periodically passing the output of said variable source through said constant source, means for separating the signal of the output of said constant source plus said variable source from the signal of the output of said constant source alone, a ratio detector for determining a difference between the power of said signals, said ratio detector comprising a pair of condensers, one side of each of said condensers being rounded, means for supplying one of said signals to the ungrounded side of one of said condensers, means for supplying the other of said signals to the ungrounded side of the other of said condensers, and means responsive to a difference of charge on said condensers for varying the output of said variable source to compensate for said difference.

2. An electrical circuit including a signal source, a variable gain amplifier for the signal from said source, and means for varying the gain of said amplifier to match the internal noise of a device included in said circuit, said means comprising means for supplying the amplified signal from said source to said device, means for periodically interrupting the signal from said source, a ratio detector, monitoring means synchronized with said interrupting means and connected between said device and said ratio detector for separating the output of said device into two signals one of which consists of said reference signal and said internal noise and the other of which consists of said internal noise alone, and means responsive to a difference between the power of said two signals for varying the gain of said amplifier.

3. A noise figure meter comprising a reference signal source, means for supplying the reference signal from said source to a device to be tested, means for repeatedly interrupting the signal from said reference signal source to said device, a comparison circuit including a first condenser to which the output of the device under test is supplied during periods of interruption of said reference signal and a second condenser to which said output is supplied between periods of interruption of said reference signal, one side of each of said condensers being grounded, means responsive to a difference in the charge on said condensers for varying the power output of said reference signal source, and a power meter responsive to the power output of said reference signal source.

4. A noise figure meter comprising a noise generator having a variable output, means indicating the power output of said noise generator, means for supplying the output of said noise generator to the input of a device whose noise figure is to be determined, continuously operating means alternately passing and blocking the output of said noise generator to said device, means operating synchronously with said continuously operating means for separating the output signal of said device into two separate signals, a comparison circuit comprising a pair of condensers, each of said condensers having one plate thereof connected to ground, one of said signals being supplied to the ungrounded plate of one of said condensers, the other signal being supplied to the ungrounded plate of the other condenser, and means responsive to differences between the charges on said condensers for varying the output of said noise generator.

5. A noise figure meter comprising a noise generator, amplifier means for varying the power output of said noise generator, interrupter means for alternately passing and blocking the output of said noise generator to the input of a device to be tested, means for separating the output signal of said device into two separate signals corresponding to the periods when the noise generator output is passed and blocked, means for comparing the power of said separate signals, means rsponsive to a difference in the power of said separate signals for actuating said amplifier means to vary the output of said noise generator, and a power indicating meter calibrated in noise figure values for measuring the power output of said noise generator.

6. Signal matching means comprising a reference signal source, means for periodically passing the reference signal from said source to a device to be tested, a comparison circuit including two condensers, means for charging one plate of one of said condensers in response to the power output of said device when said reference signal is applied thereto, means for charging one plate of the other condenser in response to the output of said device when no reference signal is supplied thereto, means connecting the opposite plate of each of said condensers to ground, and means responsive to a difference in the charges on said condensers for varying the power output of said reference signal source.

7. A noise figure meter comprising a reference signal source, means for periodically passing the reference signal from said source to a device to be tested, a comparison circuit including two condensers, means for charging one plate of one of said condensers in response to the power output of said device when said reference signal is applied thereto, means for charging one plate of the other condenser in response to the output of said device when no reference signal is supplied thereto, the opposite plate of each of said condensers being connected to ground, means responsive to a difference in the charges on said condensers for varying the power output of said reference signal source, and a power meter indicating the power output of said reference signal.

8. Means for determining the noise figure of an electrical device comprising a reference signal source, a variable output amplifier for said source, means for supplying the amplified reference signal from said source to the device whose noise figure is to be determined, means for repeatedly interrupting the supply of said reference signal to said device, means operable synchronously with said interrupting means for separating the output of said device into two separate signals, one of said signals consisting of the internal noise signal of said device, the other of said signals being a combined signal consisting of the internal noise signal of said device plus the reference signal, a comparison circuit including one element to which the internal noise signal of said device is supplied and another element to which said combined signal is supplied, means responsive to a difference between said signals for varying the output of said amplifier to compensate for said difference, and means indicating the output power of said amplifier.

9. Signal matching means comprising a pair of condensers, signal input means for charging one side of one of said condensers positively, additional signal input means for charging one side of the other condenser negatively, the opposite side of each of said condensers being grounded, and means responsive to a difference in the charges on said condensers for varying the power of one of said signal input means.

10. A comparison circuit comprising a pair of diodes and a pair of condensers, the anode of one of said diodes being connected to one side of one of said condensers, the cathode of the other diode being connected to one side of the other condenser, the opposite side of each condenser being grounded, means supplying a signal to the cathode of one of said diodes, means supplying a second signal to the anode of the other diode, and means connected across said other diode and responsive to a difference in the charges on said condensers for varying the power of one of said signals.

References Cited in the file of this patent

UNITED STATES PATENTS

| | | |
|---|---|---|
| 2,620,438 | Cotsworth | Dec. 2, 1952 |
| 2,660,705 | Field | Nov. 24, 1953 |
| 2,691,098 | Selove | Oct. 5, 1954 |